(12) United States Patent
Park et al.

(10) Patent No.: US 6,478,050 B2
(45) Date of Patent: Nov. 12, 2002

(54) MANUAL VALVE OF A HYDRAULIC PRESSURE CONTROL SYSTEM FOR AN AUTOMATIC TRANSMISSION OF A VEHICLE

(75) Inventors: Jong-Sool Park, Kyungki-do (KR); Chang-Wook Lee, Kyungki-do (KR); Jae-Ho Cho, Kyungki-do (KR); Jae-Duk Jang, Kyungki-do (KR); Tae-Kyun Kim, Kyungki-do (KR); Jin-Hee Lee, Kyungki-do (KR)

(73) Assignee: Hyundai Motor Co., Seoul (KR)

( * ) Notice: Subject to any disclaimer, the term of this patent is extended or adjusted under 35 U.S.C. 154(b) by 0 days.

(21) Appl. No.: 09/928,423

(22) Filed: Aug. 14, 2001

(65) Prior Publication Data

US 2002/0083986 A1 Jul. 4, 2002

(30) Foreign Application Priority Data

Dec. 30, 2000 (KR) ............................................. 00-87014

(51) Int. Cl.$^7$ ............................................... F15B 13/07
(52) U.S. Cl. .................................... 137/625.69; 477/142
(58) Field of Search ....................... 137/625.69; 477/142

(56) References Cited

U.S. PATENT DOCUMENTS 4,875,392 A * 10/1989 Kuwayama et al. ......... 477/142
5,085,102 A * 2/1992 Iwase et al. ............ 137/625.69
5,337,625 A * 8/1994 Jang ............................ 477/142

* cited by examiner

*Primary Examiner*—Gerald A. Michalsky
(74) *Attorney, Agent, or Firm*—Birch, Stewart, Kolasch & Birch, LLP

(57) ABSTRACT

A manual valve of a hydraulic pressure control system for an automatic transmission of a vehicle according to the present invention comprises a valve body provided with a line pressure receiving port, a P/N range port for supplying hydraulic pressure in more than one range of parking range P and neutral range N, a plurality of hydraulic pressure supplying ports and a plurality of exhaust ports; and a valve spool slidably inserted into the valve body and having a plurality of valve lands, a first valve land of said plurality of valve lands having a exhaust groove depressed toward a neighboring land, wherein:

each width of the line pressure receiving port and the P/N range port is smaller than each diameter of said plurality of valve lands, whereby a tight seal is maintained when each of the line pressure receiving port and the P/N range port is blocked by said plurality of valve lands; and each width of the plurality of hydraulic pressure supplying ports is greater than each diameter of said plurality of valve lands, whereby hydraulic pressure reserved in each of said plurality of hydraulic pressure supplying ports is exhausted through the exhaust groove when blocked by the first land.

9 Claims, 9 Drawing Sheets

MANUAL VALVE OF A HYDRAULIC PRESSURE CONTROL SYSTEM FOR AN AUTOMATIC TRANSMISSION OF A VEHICLE

CROSS-REFERENCE TO RELATED APPLICATION

This application claims priority of Korea patent Application No. 2000-87014, filed on Dec. 30, 2000.

BACKGROUND OF THE INVENTION (a) Field of the Invention

The present invention relates to a manual valve used in a hydraulic pressure control system for an automatic transmission.

(b) Description of the Related Art

Generally, a conventional automatic transmission for a vehicle includes a multi-stage gear shift mechanism connected to a torque converter, and a plurality of friction elements actuated by hydraulic pressure under control of a hydraulic pressure control system for selecting a gear stage of the gear shift mechanism.

In such automatic transmissions, the hydraulic pressure control system includes a pressure regulating means for controlling a level of hydraulic pressure generated by a hydraulic pump, manual/automatic shift control means for performing shift operation, hydraulic pressure control means for adjusting responsiveness and shift quality by smoothing shift operation, hydraulic pressure distributing means for distributing the pressure from the hydraulic pressure control means to appropriate friction elements, and damper clutch control means for controlling operation of a damper clutch of a torque converter.

The gear shift control is achieved by the friction elements being selectively and differently applied by hydraulic pressure from the distribution means and cooperation of on/off and duty control solenoid valves, such that a constitution and control method of a hydraulic control system depends on particular power trains adapted by car makers and how the power trains are controlled.

FIG. 1 shows a conventional hydraulic control system for an automatic transmission.

When a torque converter 2 is driven, a hydraulic pump 4 generates hydraulic pressure required for controlling the torque converter 2 and shift control and for lubrication. The hydraulic pressure generated by the hydraulic pump 4 is supplied to pressure regulating means, damper clutch control means, and reducing means, and to pressure control means via manual/automatic shift control means to be modulated to a shift control pressure. The shift control pressure controlled by the pressure control means is supplied to the friction elements as operating pressure via switching means and fail-safe means. The hydraulic pressure is directly supplied from the manual/automatic control means to N-R control means, and then to the friction elements.

Describing more in detail, the pressure regulating and damper clutch control means includes a regulator valve 6 for uniformly regulating hydraulic pressure generated by the hydraulic pump 4, a torque converter control valve 8 for supplying the regulated hydraulic pressure to the torque converter 2 and for adjusting the regulated hydraulic pressure to be suitable for lubrication, a damper clutch control valve 10 for controlling a damper clutch to improve a power transmission efficiency of the torque converter 2.

The reducing means comprises a reducing valve 12 for reducing hydraulic pressure to be lower than the line pressure. Part of the hydraulic pressure reduced by the reducing valve 12 is directed to the damper clutch control valve 10 and the regulator valve 6 as control pressure, and the rest is supplied to first, second and third pressure control valves 14, 16 and 18 that are controlled by first, second and third solenoid valves S1, S2 and S3, respectively.

The manual/automatic shift control means includes a manual valve 20 cooperating with a shift selector lever (not shown). The hydraulic pressure fed to the manual valve 20 is, in accordance with the operation of the shift selector lever, directed to the first, second and third pressure control valves 14, 16, 18 as control pressure, or directly to first and second switch valves 22 and 24, the first and second fail-safe valves 26 and 28, and the N-R control valve 30 as control pressure and operating pressure to be fed to the fiction elements.

In the above described hydraulic control system, when an engine is operating, line pressure of a certain degree is required for supplying fluid as lubricant to rotating elements regardless of the range that the manual valve 20 is in.

Furthermore, when the manual valve is displaced in a parking range P or a neutral range N, line pressure identical to or lower than that required for forward ranges D, 3, 2 and L is required to prepare for the shift operation into forward and reverse ranges. Line pressure required for the reverse range R is generally higher than that for the forward ranges.

However, since the shift range of the manual valve 20 is arranged in the order of P, R, N, D, 3, 2, and L, that is, since the reverse range R is arranged between the parking and neutral ranges P and N, it is practically difficult to satisfy the above requirements.

Accordingly, some hydraulic control systems have been designed such that no line pressure is formed in the parking range P. However, in these cases, when the engine is operated for a long time in the parking range P, rotating elements suffer a lack of lubrication since there is no line pressure.

Therefore, it has become a trend that line pressure is basically formed in the parking and neutral ranges P and N so as to supply lubricant to the rotating elements.

FIGS. 14a and 14b shows a conventional manual valve which is designed to form line pressure in the parking and neutral ranges P and N.

A valve body of a manual valve is provided with a first port 200 for receiving hydraulic pressure from a regulator valve, a second port 202 for supplying the hydraulic pressure fed through the first port 200 to parking and neutral range pressure lines, a third port 204 for supplying the hydraulic pressure fed through the first port 200 to drive, second, and low range pressure lines, fourth and fifth ports 206 and 208 for supplying hydraulic pressure fed through the first port 200 to a reverse range pressure line, and an exhaust port EX for exhausting the hydraulic pressure fed to the fourth and fifth ports 206 and 208.

A valve spool 210, being movably disposed in the valve body in accordance with the manipulation of the shift selector lever, includes a first land 214 formed proximate to a connector 212, positioned between the second and third ports 202 and 204 in the parking range P, and positioned on one side of the third port 204 in other ranges R, N, D, 3, 2 and L; a second land 216 for communicating the second or third port 202 or 204 with the first port 200 in all ranges except for the parking and reverse ranges P and R; and a third land 218 for communicating the first port 200 with the fourth and fifth ports 206 and 208 in the reverse range R.

Also, the valve spool 210 is further provided with an exhaust hole 220 formed from the connector 212 to the second land 216, a first release opening 222 formed between the first and the second lands 214 and 216 in a vertical direction with respect to an axis of the valve spool 210, and a second release opening 224 formed proximal to the connector 212 between the first land 214 and the connector 212.

In the parking range P, the hydraulic pressure supplied to the manual valve through the first port 200 is directed to the second port 202 and the exhaust hole 220 through the first release opening 222. In the reverse range R, the first port 200 communicates with the fourth and fifth ports 206 and 208, and in the neutral range N, the first port 200 communicates with the second port 202. In the forward ranges D, 2 and L, the first port 200 communicates with the second and third ports 202 and 204.

In this conventional manual valve, since the hydraulic pressure fed from the hydraulic pump 4 is used for lubrication and hydraulic pressure for a parking and neutral range, there is no problem in lubricating the rotating members in the parking and neutral ranges P and N. However, since the hydraulic pressure is fed through the second release opening 224, the eccentric force is applied to the valve spool 210. Therefore, when the system is used for a long time, the valve spool 210 may be worn in one side. This results in leakage of fluid and thereby a lowering of the line pressure.

Furthermore, when the eccentric force is continuously applied to the valve spool 210, a land thereof may be caught on an end of a port, thereby disturbing the movement of the valve spool 210.

Accordingly, a very strict quality control is required to provide enough structural strength of a manual valve.

Furthermore, the valve spool is made through a complicated process. For example, holes 220 and 224 must be formed by drilling, a cap for obstructing the exhaust hole 220 is required and then the connector must be connected. This causes the manufacturing costs to be increased and the productivity to be deteriorated.

SUMMARY OF THE INVENTION

Therefore, the present invention has been made in an effort to solve the above problems.

It is an objective of the present invention to provide a manual valve of a hydraulic pressure control system capable of forming line pressure at parking and neutral ranges P and N to improve lubrication, and to reduce the manufacturing costs by simplifying the manufacturing process.

To achieve the above objective this invention provides a manual valve of a hydraulic pressure control system for an automatic transmission of a vehicle, comprising:
  a valve body provided with a line pressure receiving port, a P/N range port for supplying hydraulic pressure in more than one of parking range P and neutral range N, a plurality of hydraulic pressure supplying ports and a plurality of exhaust ports; and
  a valve spool slidably inserted into the valve body and having a plurality of valve lands, a first valve land of said plurality of valve lands having an exhaust groove depressed toward a neighboring land; wherein:
  each width of the line pressure receiving port and the P/N range port is smaller than each diameter of said plurality of valve lands, whereby a tight seal is maintained when each of the line pressure receiving port and the P/N range port is blocked by said plurality of valve lands; and
  each width of the plurality of hydraulic pressure supplying ports is greater than each diameter of said plurality of valve lands, whereby hydraulic pressure reserved in each of said plurality of hydraulic pressure supplying ports is exhausted through the exhaust groove when blocked by the first land.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

Preferred embodiments of the present invention will be described hereinafter with reference to the accompanying drawings.

Figure 1:
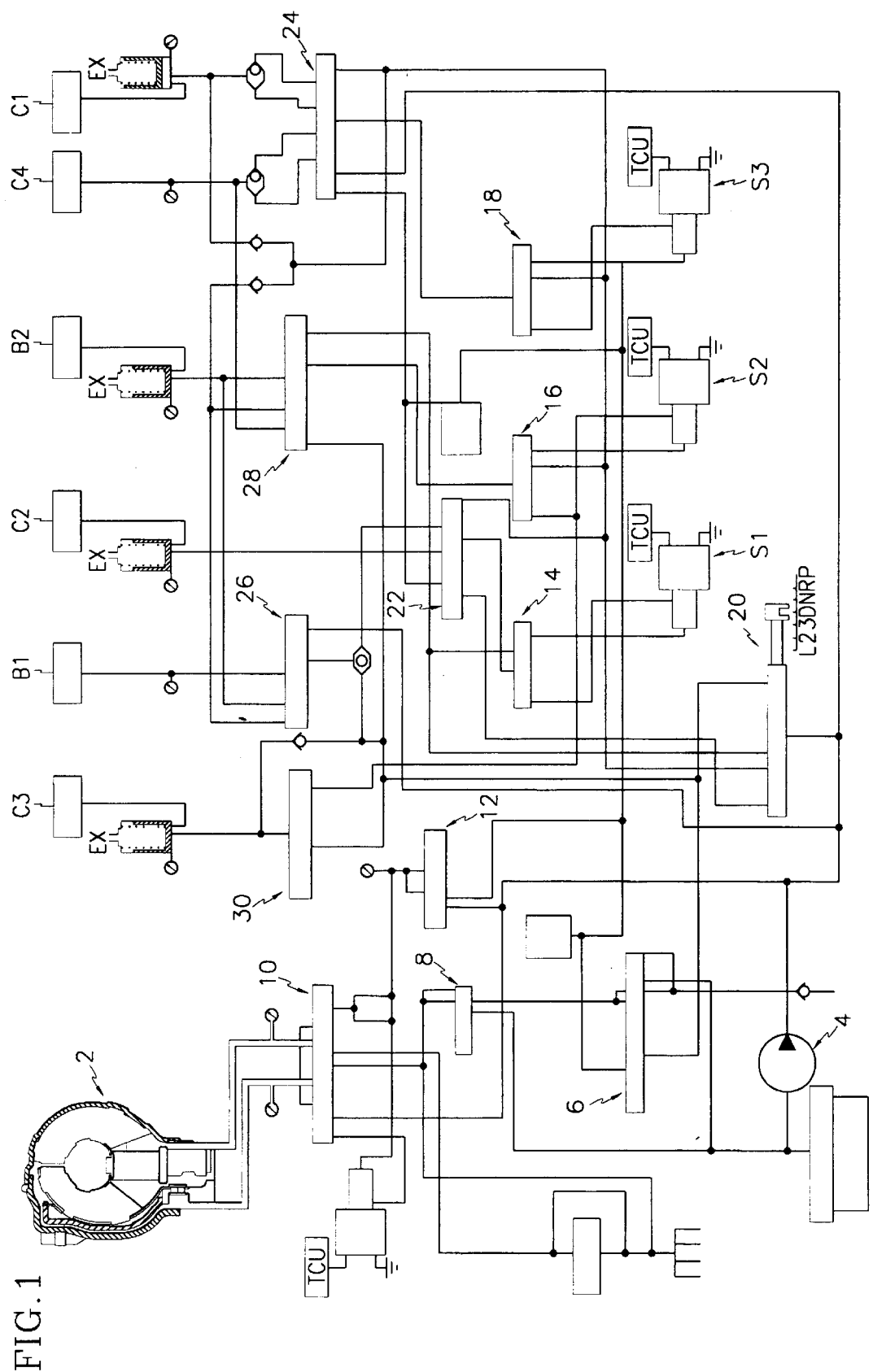
FIG. 1 is a hydraulic circuit diagram of a hydraulic pressure control system where the present invention is applied.

FIG. 1 is a hydraulic circuit diagram of a hydraulic pressure control system where a manual valve according to the present invention may be applied. As it is already described in the related art hereinabove, the detailed description thereof will be omitted herein. A description of the hydraulic circuit diagram is incorporated herein.

Figure 2:
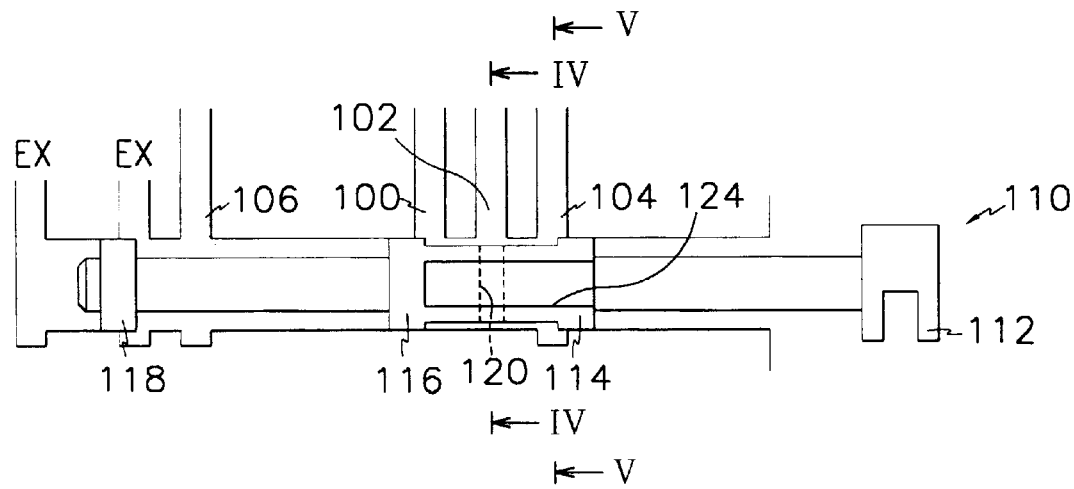
FIG. 2 is an enlarged view showing a manual valve according to a first embodiment of the present invention.
Figure 3:
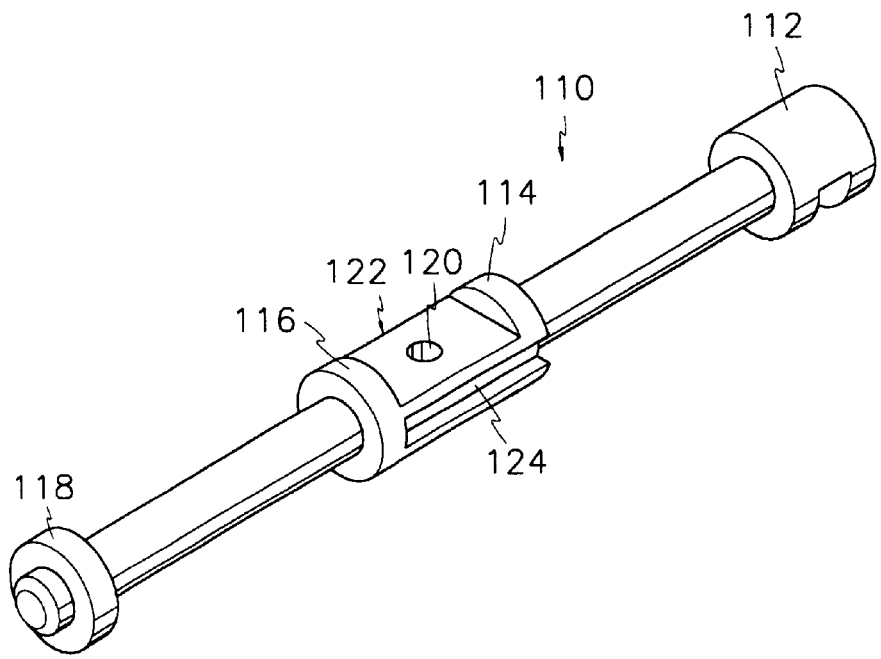
FIG. 3 is a perspective view of a valve spool of the manual valve depicted in FIG. 2.

FIG. 2 shows a manual valve according to a first embodiment of the present invention.

A valve body of the inventive manual valve 20 is provided with a first port 100 for receiving hydraulic pressure from the regulator valve 12, a second port 102 for supplying the hydraulic pressure fed through the first port 100 as parking and neutral range pressures, a third port 104 for supplying the hydraulic pressure fed through the first port 100 as drive, second and low range pressures, a fourth port 106 for supplying the hydraulic pressure fed through the first port 100 as reverse range pressure, and an exhaust port EX for exhausting the hydraulic pressure fed to the fourth port 106.

A valve spool 110 disposed in the valve body and cooperating with the select lever comprises a first land 114 formed in the vicinity of a connector 112, a second land 116 next to the first land 114, and a third land 118 next to the second land 116.

The first land 114 is designed to be positioned between the second and third ports 102 and 104 in the parking range P (see FIG. 6) and positioned on one side of the third port 104 distal from the second port 102 in other ranges R, N, D, 2 and L (see FIGS. 7 through 11).

The second land 116 is disposed at a predetermined distance from the first land 114 such that the second land 116 is positioned according to the position of the connector 112, where the positions of the second land 116 are, on one side of the first port 100 distal from the second port 102 in the parking P range, between the first and second ports 100 and 102 in the reverse R range, between the second and third ports 102 and 104 in the neutral N range so that the first and second ports 100 and 102 communicate with each other, on one side of the third port 104 distal from the second port 102 in other ranges D, 2 and L. (see FIGS. 8 through 11), The third land 118 is disposed at a predetermined distance from the second land 116 such that the third land 118 is positioned on one side of the fourth port 106 distal from the first port 100 in the parking and reverse ranges P and N so that the fourth port 106 and the first port 100 communicate with each other in the reverse R range (see FIG. 7).

When machining the first and second lands 114 and 116, a cylindrical body having a predetermined diameter is first formed, then the first and second lands 114 and 116 each having a predetermined thickness are preliminarily defined at both end portions of the cylindrical body. Upper and lower portions of the cylindrical body between the preliminarily defined first and second lands 114 and 116 are processed to be flat, thereby forming the first and second lands 114 and 116. Then, a through hole 120 is processed passing through the upper and lower surface processed to be flat, thereby forming a fluid passage communicating upper and lower chambers 122 which are defined by the first and second lands 114 and 116 with the valve body.

In addition, an exhaust groove 124 extending through the first land 114 is formed on a portion of the cylindrical body that is not processed to be flat.

Figure 4:
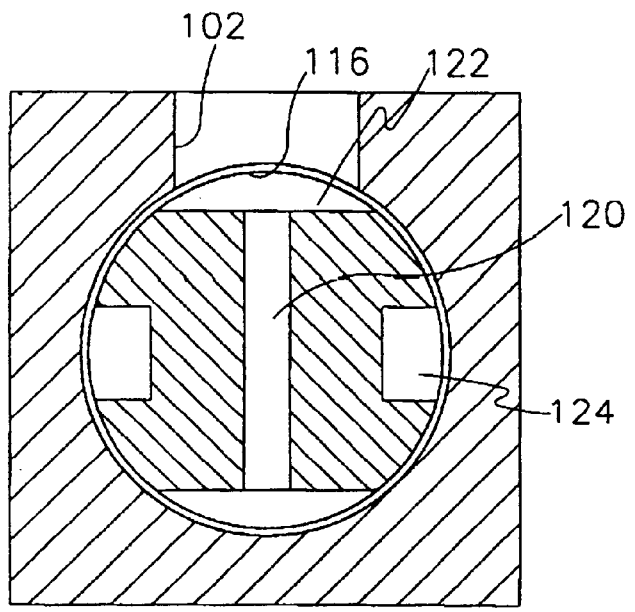
FIG. 4 is a cross-sectional view taken along line IV—IV of FIG. 2.
Figure 5:
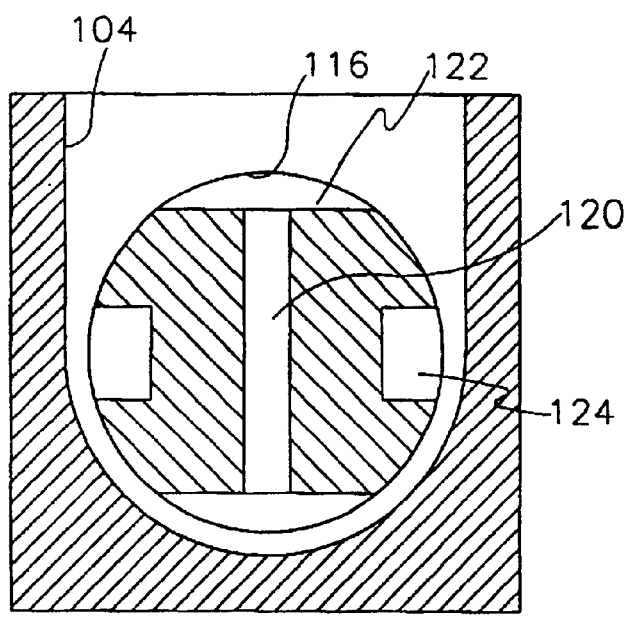
FIG. 5 is a cross-sectional view taken along line V—V of FIG. 2.

The first and second ports 100 and 102 are designed such that the widths of the first and second ports 100 and 102 are less than the diameters of the first and second lands 114 and 116 so as to maintain a tight seal (see FIG. 4). The third and fourth ports 104 and 106 are designed such that the widths of the third and fourth ports 104 and 106 are greater than the diameters of the first and second lands 114 and 116.

Accordingly, the hydraulic pressure introduced between the first and second lands 114 and 116 is exhausted by leakage only. In the reverse range R, the second and third ports 102 and 104 communicate with outside of the valve, and in the neutral range N, only the third port 104 communicates with the outside. If a port communicates with the outside of the valve, fluid is exhausted from the port to the outside of the valve.

The fluid passage converting process of the manual valve 20 will be described hereinafter.

Figure 6:
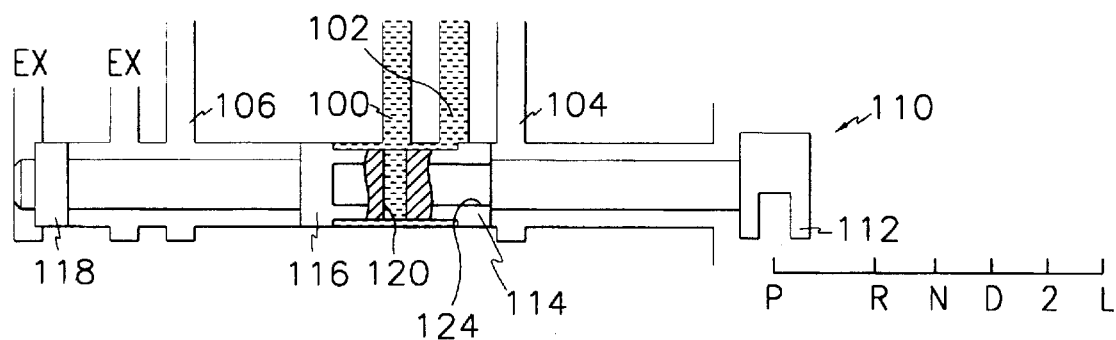
FIG. 6 is a view illustrating the manual valve of FIG. 2 when it is positioned to a parking range P.

In the parking range P, as shown in FIG. 6, the hydraulic pressure fed through the first port 100 is fed to the second port 102 through the fluid passage formed between the first and second lands 114 and 116.

Figure 7:
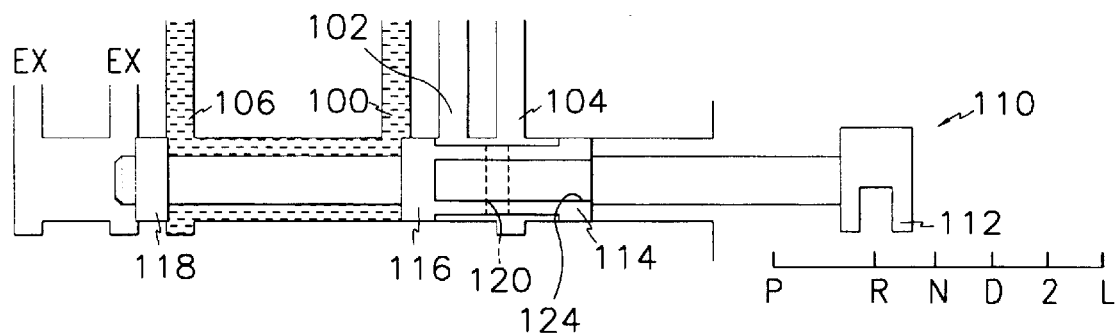
FIG. 7 is a view illustrating the manual valve of FIG. 2 when it is positioned to a reverse range R.

In the reverse range R, as shown in FIG. 7, the hydraulic pressure fed through the first port 100 is fed to the fourth port 106.

Figure 8:
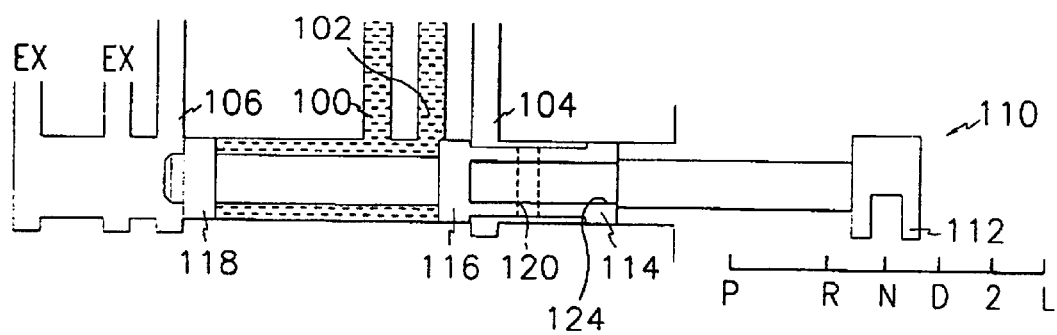
FIG. 8 is a view illustrating the manual valve of FIG. 2 when it is positioned to a neutral range N.
Figure 9:
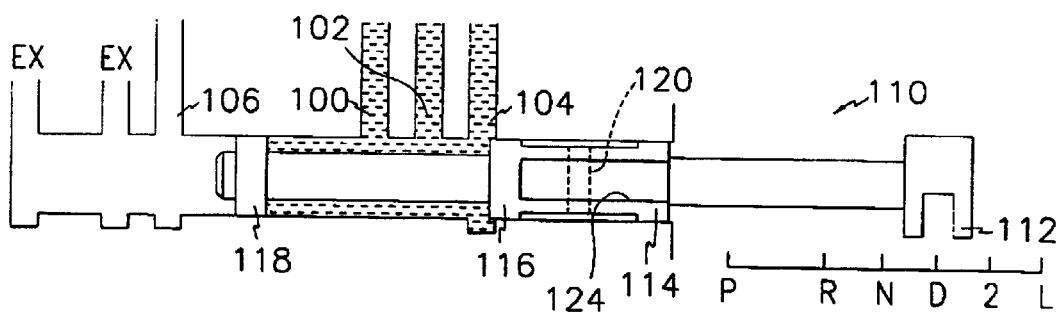
FIG. 9 is a view illustrating the manual valve of FIG. 2 when it is positioned to a drive range D.
Figure 10:
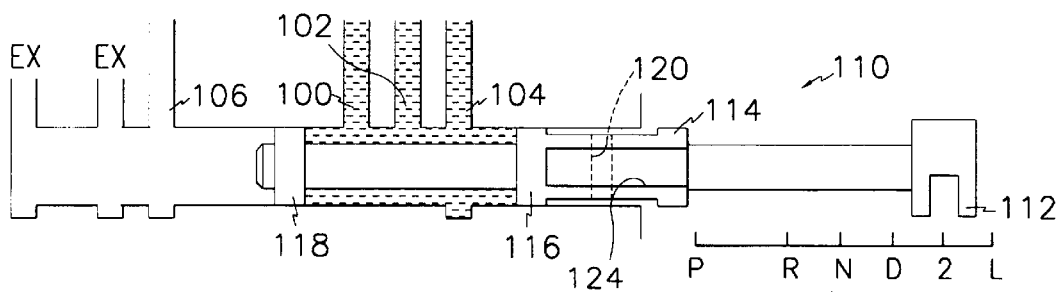
FIG. 10 is a view illustrating the manual valve of FIG. 2 when it is positioned to a second range 2.
Figure 11:
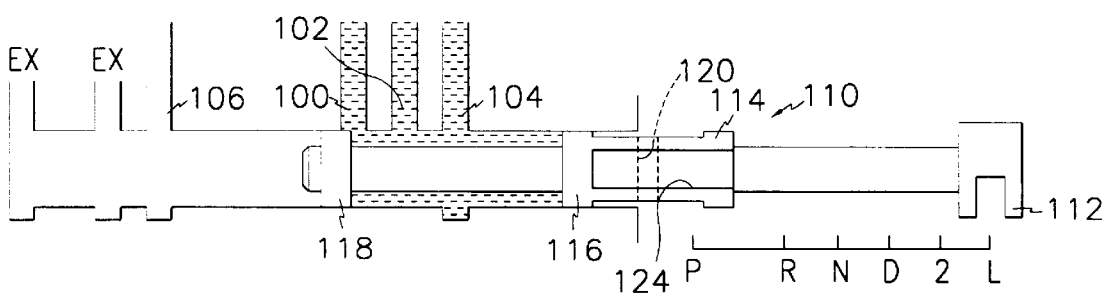
FIG. 11 is a view illustrating the manual valve of FIG. 2 when it is positioned to a low range L.

In the neutral range N, as shown in FIG. 8, the hydraulic pressure fed through the first port 100 is fed to the second port 102 to be used for lubrication. In the neutral range N, hydraulic pressure in the third port 104 is exhausted to outside of the valve via the exhaust groove 124.

In the drive range D, the hydraulic pressure fed through the first port 100 is supplied to the second and third ports 102 and 104.

In the second and low ranges 2 and L, as in the drive range D, the hydraulic pressure fed through the first port 100 is supplied to the second and third ports 102 and 104.

In the parking and neutral ranges P and N, hydraulic pressure uniformly acts on the first and second lands 114 and 116 or the second and third lands 116 and 118. That is, no eccentric or biasing force is applied to the lands, thereby preventing the manual valve from being damaged by the eccentric force during movement for range shifting.

Figure 12A:
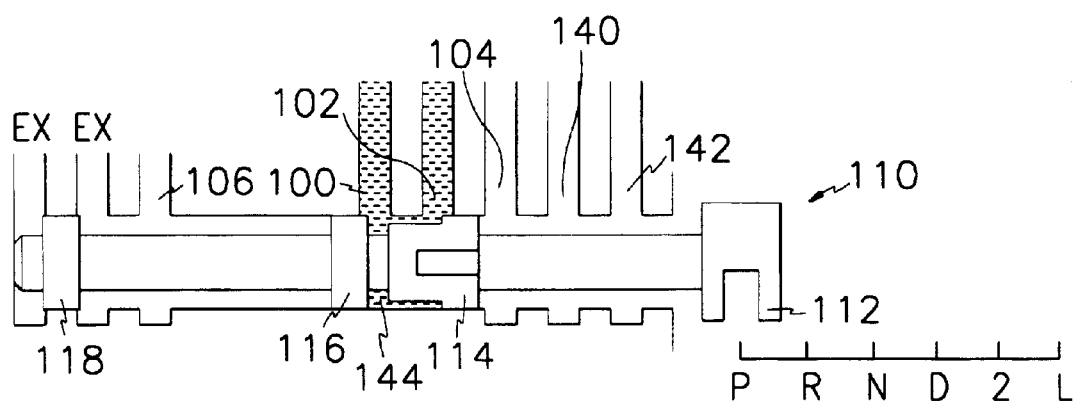
FIG. 12a is a view illustrating a manual valve according to a second embodiment of the present invention when it is positioned to a parking range P.
Figure 12B:
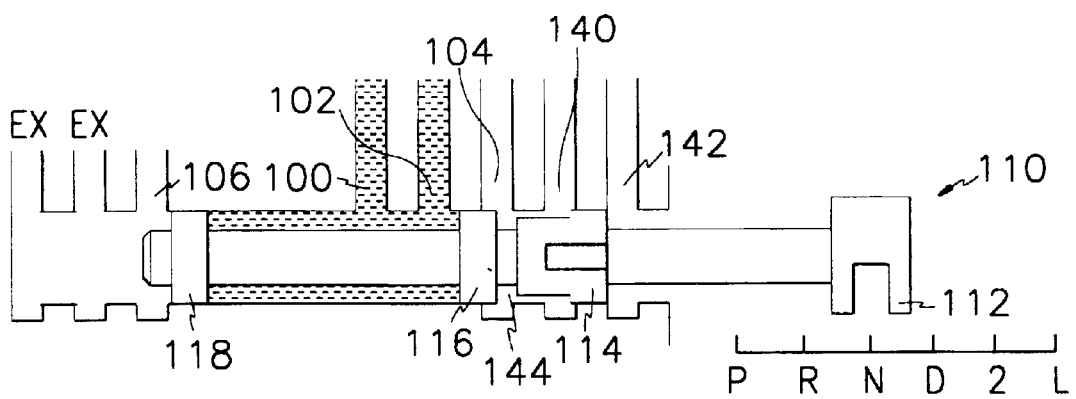
FIG. 12b is a view illustrating the manual valve of FIG. 12a when it is positioned to a neutral range N.

FIGS. 12a and 12b show a manual valve according to a second embodiment of the present invention.

Many features of a manual valve of this embodiment are identical to those of the first embodiment, therefore only the difference is described hereinafter.

The manual valve of the second embodiment further includes a fifth and sixth ports 140 and 142 in its valve body. The fifth port 140 is for supplying second range pressure, and the sixth port 142 is for supplying low range pressure.

The fifth and sixth ports 140 and 142 are designed such that the widths of the fifth and sixth ports 140 and 142 are greater than the diameters of the first and second lands 114 and 116.

Furthermore, the through hole 120 formed between the first and second lands 114 and 116 in the first embodiment is omitted in this embodiment. Instead, a circumference groove 144 is formed on an exterior portion between the second land 116 and the fluid passage through the upper and lower chambers 122 so that the circumference groove 144 can function as the through hole 120 of the first embodiment. An exhaust groove 124 is formed having a length such that adjacent ports of the second, third, fifth and sixth ports 102, 104, 140 and 142 can communicate with each other by the exhaust groove 124. Therefore, in the reverse range R, the hydraulic pressure of the second port 102 is exhausted through the exhaust groove 124 via the upper and lower chambers 122.

Accordingly, as shown in FIGS. 12a and 12b, lubricating fluid can be supplied through the second port 102 in the parking and neutral ranges P and N, while preventing eccentric hydraulic pressure, and thereby withholding the function that unnecessary hydraulic pressure is exhausted through the exhaust groove 124.

Figure 13A:
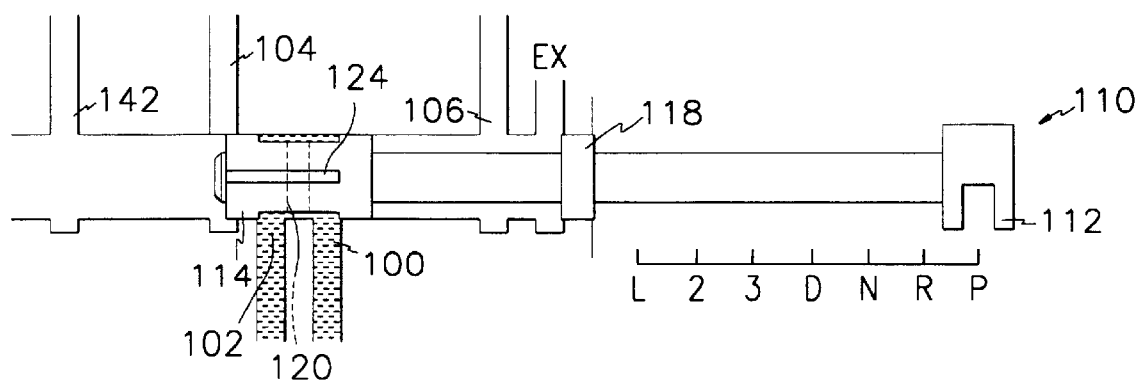
FIG. 13a is a view illustrating a manual valve according to a third embodiment of the present invention when it is positioned to a parking range P.
Figure 13B:
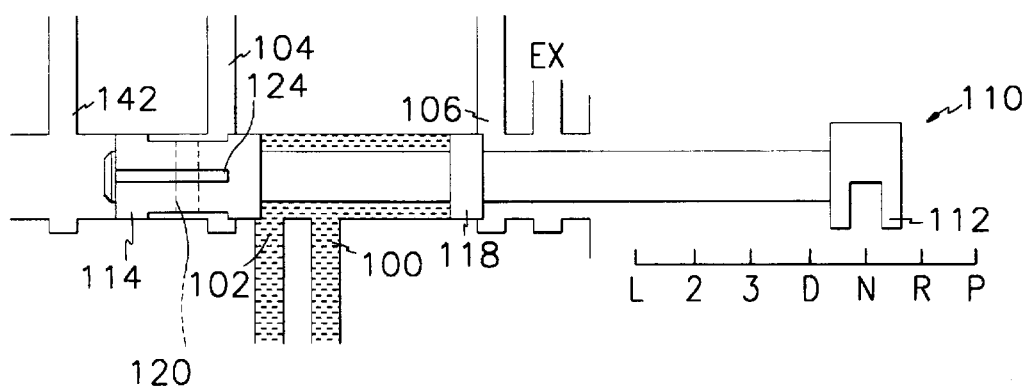
FIG. 13b is a view illustrating the manual valve of FIG. 13a when it is positioned to a neutral range N.
Figure 14A:
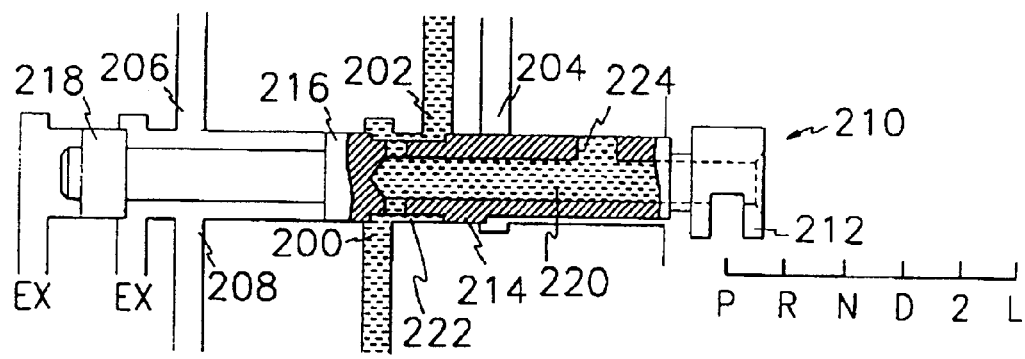
FIG. 14a is a view illustrating a conventional manual valve when it is positioned to a parking range P.
Figure 14B:
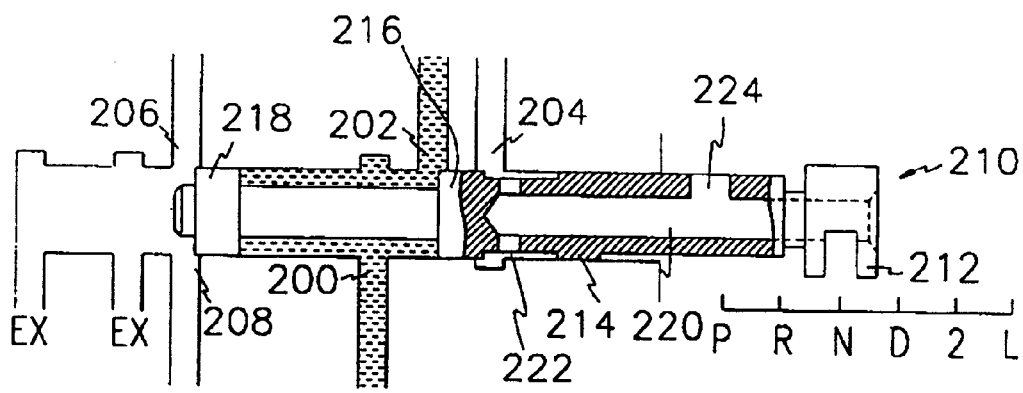
FIG. 14b is a view illustrating the manual valve of FIG. 14a when it is positioned to a neutral range N.

FIGS. 13a and 13b show a manual valve according to a third embodiment of the present invention.

Many features of a manual valve of this embodiment are identical to those of the first embodiment, therefore only the difference is described hereinafter.

That is, in the first embodiment, the range position is set in the order of P, R, N, D, 2 and L from the valve body.

However, in this third embodiment, the range position is set in the order of L, 2, 3, D, N, R and P from the valve body. Accordingly, the ports of the valve body and lands of the valve spool are also displaced in accordance with the varied range position. That is, the valve body and valve spool can be understood as mirror images of those in the first embodiment.

As described above, according to the manual valve of the present invention, hydraulic pressure is supplied to the hydraulic pressure control system even at the parking and neutral ranges P and N so as to make it possible to control the line pressure to prevent the friction elements from being damaged, and to prevent the sudden acceleration performance from deteriorating.

In addition, the present invention prevents friction between valve spool and valve body caused by an eccentric force, because hydraulic pressure acting on the valve spool is symmetrical in any shift range. Therefore the present invention prevents possible abrasion of the interior surface of the valve body, which is usually made of aluminum, from friction with the valve spool, which is usually made of steel.

Furthermore, a manufacturing process is simple in comparison with the prior art because there is no hole in the valve spool along its axis and it does not need a process of plugging a cap and then connecting the connector.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A manual valve of a hydraulic pressure control system for an automatic transmission of a vehicle, comprising:
    a valve body provided with a line pressure receiving port, a P/N range port for supplying hydraulic pressure in more than one of parking range P and neutral range N, a plurality of hydraulic pressure supplying ports and a plurality of exhaust ports; and
    a valve spool slidably inserted into the valve body and having a plurality of valve lands, a first valve land of said plurality of valve lands having an exhaust groove depressed toward a neighboring land;
    wherein:
        each width of the line pressure receiving port and the P/N range port is smaller than each diameter of said plurality of valve lands, whereby a tight seal is maintained when each of the line pressure receiving port and the P/N range port is blocked by said plurality of valve lands; and
        each width of the plurality of hydraulic pressure supplying ports is greater than each diameter of said plurality of valve lands, whereby hydraulic pressure reserved in each of said plurality of hydraulic pressure supplying ports is exhausted through the exhaust groove when blocked by the first land.

2. A manual valve of claim 1, wherein a hydraulic path is formed between opposite surfaces around an axis of the valve spool and between the first land and a second land, the second land being proximate to the first land in a direction that the exhaust groove is depressed, thereby preventing a biasing force acting on the valve spool vertically to the axis.

3. A manual valve of claim 2, wherein each of said opposite surfaces forms a chamber in cooperation with an interior surface of the valve body, a length of the chamber being such that the P/N range port can communicate 5 with its proximate port through the chamber.

4. A manual valve of claim 3, wherein said plurality of hydraulic pressure supplying ports comprise a forward range port and an R range port, and said valve spool communicates the receiving port with a predetermined port according to disposition of the valve spool such that the receiving port communicates with:
    the P/N range port between the first and second lands in parking P range;
    the R range port between the second and a third land in reverse R range, whereby the pressure in the P/N range port and the forward range port, the ports being disposed between the first and second lands, is exhausted through the exhaust groove;
    the P/N range port between the second and third lands in neutral N range; and
    the P/N range port and forward range port between the second and third lands.

5. A manual valve of claim 4, wherein:
    said plurality of supplying ports further comprises a second speed range port for supplying hydraulic pressure in second speed 2 range, and an L range port for supplying hydraulic pressure in low L range;
    the second speed port is further communicated to the receiving port between the second and third lands in second speed 2 range; and
    the L range port is further communicated to the receiving port between the second and third lands in low L range.

6. A manual valve of claim 4, wherein:
    ports of the valve body are arranged in the order of R range port, receiving port, P/N range port, and forward range port;
    the lands of the valve spool are arranged in the order of the third and the second and the first lands; and
    a connector for selecting ranges is connected to the first land.

7. A manual valve of claim 4 wherein:
    ports of the valve body are arranged in the order of R range port, receiving port, P/N range port, and forward range port;
    the lands of the valve spool are arranged in the order of the third and the second and the first lands; and
    a connecter for selecting ranges is connected to the third land.

8. A manual valve of claim 4 wherein the hydraulic path is a through hole penetrating the valve spool.

9. A manual valve of claim 4 wherein the hydraulic path is a circumferential groove formed on the valve spool.

* * * * *